Dec. 23, 1958   I. D. PRESS   2,865,094
METHOD OF SECURING A COUPLING TO AN END OF
A HIGH TEMPERATURE FLEXIBLE HOSE
Filed Oct. 4, 1954

INVENTOR.
Irving D. Press
BY
Churchill, Rich Weymouth & Engel
Attorneys

United States Patent Office 2,865,094
Patented Dec. 23, 1958

2,865,094

METHOD OF SECURING A COUPLING TO AN END OF A HIGH TEMPERATURE FLEXIBLE HOSE

Irving D. Press, West Orange, N. J., assignor to Resistoflex Corporation, Belleville, N. J., a corporation of New York Application October 4, 1954, Serial No. 460,025

2 Claims. (Cl. 29—506)

The present invention relates to hose end couplings for flexible hose and more particularly to hose having wire braid reinforcement.

There has recently been developed in the hose art a plastic-lined flexible hose particularly for use at high temperatures such as those encountered by the fuel lines of jet engines and the like, which fuel lines are also required to pass rigid fire tests involving high internal hydraulic pressures during which the coupling must not separate from the hose. The high temperature requirements of the hose are met by using a tube or liner of "Teflon" (polytetrafluoroethylene) which has a covering reinforcement of steel wire braid and the coupling of the invention is intended primarily for use with such hose.

One object of the invention is to provide a simple and effective structure in which the coupling is securely locked to the wire braid independently of the tube.

Another object is to provide a coupling which remains securely attached and proof against leakage notwithstanding some cold flow of the hose liner or tube under the clamping pressure of the coupling.

A further object is to provide an improved method of applying hose end fittings.

Other objects and advantages will in part appear and in part will be obvious from the following detailed description of the present preferred embodiment of the invention, given by way of illustration, taken in conjunction with the drawings in which.

Figure 1:
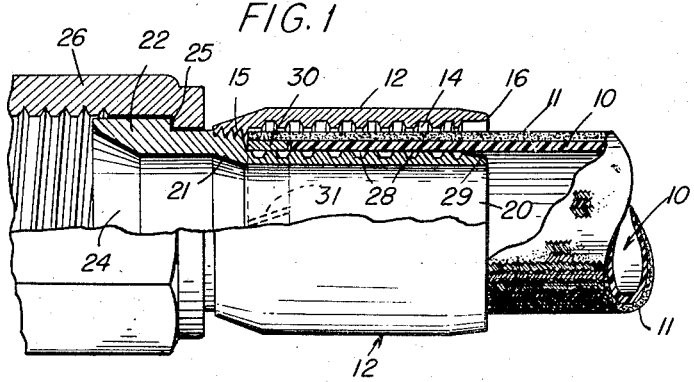
Fig. 1 is an elevation, partly in central longitudinal section, of the parts of a coupling or end fitting applied to the end of a hose preparatory to their attachment.
Figure 4:
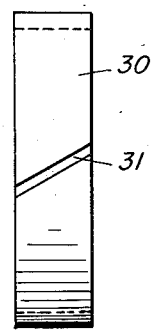
Fig. 4 is an elevation of the lock-sleeve or split ring which may be used as part of the end fitting shown in Figs. 1–3 as a part of the coupling.

The essential parts of the coupling will first be described with reference to Figs. 1 and 4 followed by a description of the novel method of their assembly to produce the desired results.

The end of a hose is shown which has a tube or liner 10 of Teflon or equivalent material, covered and reinforced by one or more layers of wire braid 11, of stainless steel for example. This hose end is enclosed in a generally cylindrical socket or ferrule 12, preferably of steel, of such size as to slip freely over the hose end. The socket has a coarse internal thread 14 extending throughout most of its length thus providing a spiral rib the top of which is flat so as to be able to grip the braid without cutting it. The opening through the base of the socket is slightly smaller than its ribbed portion and is internally threaded at 15. The edge of the opposite end may be thinned down by an external bevel and rounded off at 16. If desired, the base of the ferrule may be modified by providing around its threaded portion 15 an external hexagonal or other form of wrench-engaging flange for holding purposes.

A nipple 20 is provided which has a generally cylindrical end portion for insertion inside the hose end, behind which is a shoulder portion 21 externally threaded for engagement with the threads 15 and internally tapered as shown to provide an outwardly flaring junction with the larger internal wall of the connecting portion or base 22. This base has a standard female conical seat 24 and an external shoulder 25 engaged by the flanged nut 26, internally threaded in the usual way. The end portion of nipple 20 which enters the hose end is provided with serrations 28 in the form of circumferential ribs and with a tapered nose 29. The connecting portion 22 of the nipple, which is no part of the invention, may be replaced by any other desired form of connection. The socket and nipple may, of course, be of one piece construction, or integral, as is well known in the art.

The above described socket and nipple are the principal and essential parts of the coupling and one aspect of the invention resides in their particular manner of application to the hose end as hereinafter described. For applications wherein the pressures are relatively low, for example couplings for hose rated for a maximum working pressure of 1000 p. s. i., these two parts will suffice. However, for higher working pressures of, for example, 3000 p. s. i. at temperatures of 450° to 500° F., it is desirable to use in addition a lock-sleeve in the form of the split ring 30 (Fig. 4), a metal cylindrical ring having an angular slot 31 and a wall thickness which is the same as the thickness of the hose tube 10. This lock-sleeve is inserted inside the wire braid 11 and a piece of tube 10 corresponding in length to the width of the sleeve is cut out to make room for it. In the assembly of the coupling, as hereinafter described, this lock-sleeve makes a metal-to-metal bond between the wire braid and the coupling parts, independent of the plastic liner, so that there will be no blow off, the hose remaining firmly locked to the coupling after the hose has failed by reason of a combination of high temperature and internal fluid pressure. The split lock ring feature of the invention has another advantage. Should the coupling socket and nipple be integral and made in one piece by machining the space between them, as is often desirable, the provision of a narrow annular slot at the bottom of the space to receive only the bared end of the braid 11 would be impracticable from the standpoint of production cost. The use of the lock ring, inserted in the end of the hose, makes it possible to form such a hose-receiving space of full width to the very bottom while still providing a metal-to-metal grip on the braid when the coupling is attached as hereinafter described.

Figure 2:
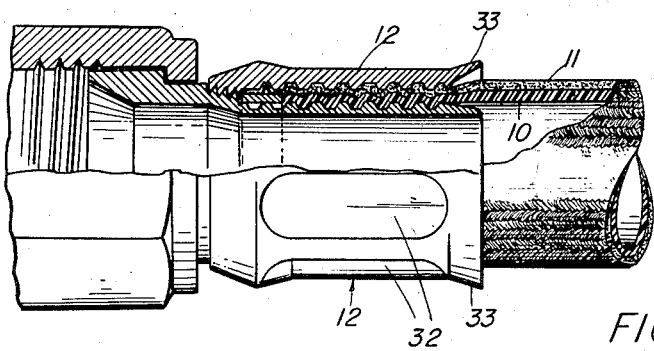
Fig. 2 is a similar view of the same after the crimping of the socket or ferrule.

The parts of the coupling are assembled and attached to the hose in the following manner. The hose end is prepared by being cut off square. If the lock-sleeve 30 is to be used a section of the tube 10 corresponding in length to the width of the sleeve is cut out, precautions being taken to prevent fraying of the braid during the operation. This may be done by holding the hose end between closely fitting split blocks or by a solder dip. The lock-sleeve is then put in place. If the lock ring is not used, this operation is omitted. In either case the assembly then proceeds as follows. The hose end is inserted in the socket 12 until its end abuts the threaded base portion. Nipple 20 is then pushed into the hose end, with which it has a close fit, and rotated into threaded engagement with the socket. The coupling is then placed in a crimping tool having radial dies which are moved inwardly to such an extent that there is an observed permanent reduction in the internal diameter of the bore of nipple 20 of from .002 to .003 inch. This, of course, permanently contracts the socket into gripping engagement with the wire braid and compresses the tough Teflon liner into the serrations 28 on nipple 20. If lock-sleeve 30 is used it also grips the wire between the socket and the sleeve. The condition of the hose end assembly at this stage is illustrated in Fig. 2. The crimping dies form depressions 32 on the socket and its outer end assumes an outwardly flared position or bell-mouth as shown at 33, which is desirable to prevent breaking of the wires during flexing of the hose.

Figure 3:
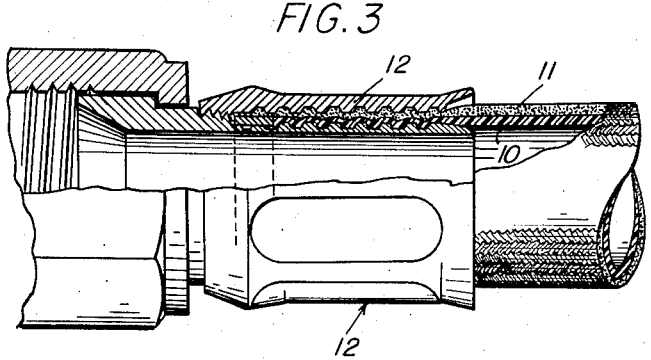
Fig. 3 is a similar view of the same after the subsequent expansion of the nipple.

Up to this point the assembly is similar to established practice in the art, except, as above noted, that the compression has been sufficient to slightly reduce the diameter of the nipple by an observable amount, which is an indication that the compression has been sufficient. This takes into account possible minor variations in the relative sizes of the parts and the hose and the wall thickness of the hose. Ordinarily the assembly of a coupling would be considered as completed at this stage. However, a further step is now performed. An expander is forced into the nipple through the tapered shoulder portion 21, progressively expanding the entire nipple against the already tightly gripped and compressed hose end. Depending on the hose size, this expansion increases the diameter of the nipple from .030 to .050 inch, having regard to a size range of hose of from 3/16" to 1½" I. D. This expansion stretches the already contracted socket, creating in it an elastic compressive force which acts continuously on the hose end. This final condition of the coupling is illustrated in Fig. 3. That this force is present has been established by the observation that there is, with time, a slight contraction of the socket as a certain amount of cold flow occurs in the Teflon liner. Thus this spring tension in the socket compensates for such cold flow as well as for thermal expansion and contraction and the coupling remains tight under all conditions. It is for this effect that the socket is preferably made of steel but other metals having the requisite elasticity might be used.

The lock-sleeve 30 is incorporated in the coupling, as shown in the drawings, where it is expected that the hose will be subjected to a combination of high pressure and high temperature. This is for the reason that if Teflon is subjected to temperatures in excess of 450–500° F. it softens and the compressive force on the hose end in the area where Teflon is present will decrease with flow of the liner. To prevent blow-off, therefore, when such temperatures are reached with concomitant high pressure it is desirable to lock the wire braid in the coupling between sleeve 30 and socket 12 independently of the grip exerted by the Teflon underlying the rest of the braid within the coupling. Tests of such a coupling subjected to flame conditions have shown that after the hose has failed the braid is still firmly held in place.

The foregoing details of construction are illustrative and are not to be construed as limitations on the invention as hereinafter defined in the claims.

What is claimed is:

1. The method of providing a permanent coupling assembly of the end of a hose, having a wire braid covering a plastic tube of a material having the substantially inelastic and limited cold flow characteristics of polytetrafluoroethylene, a metal nipple portion with external circumferential ribs extending within the tube, and a metal socket portion with internal circumferential ribbing outside said braid overlying said tube and nipple portion and joined to said nipple portion beyond the end of the hose; which comprises the steps of crimping the socket portion down onto the braid to take up any clearance therebetween; continuing the crimping of the socket portion while the nipple portion is free to contract until the nipple portion has had its internal diameter permanently reduced at least .002 inch, and the hose end has been apparently completely and permanently assembled to the coupling; and thereafter with the socket portion radially unconfined, radially expanding the nipple portion along with the hose end to expand the socket portion within its elastic limit.

2. The method of claim 1, wherein the end of the plastic tube is cut back a short distance and a cylindrical metal lock sleeve is disposed in the space thus created inside the end of the braid before the hose is assembled to the coupling, whereby the lock sleeve is in contact with the nipple portion, and the end of the braid is gripped between the lock sleeve and the socket portion after the coupling is secured to the hose.

References Cited in the file of this patent

UNITED STATES PATENTS

| | | |
|---|---|---|
| 2,025,427 | Weatherhead | Dec. 24, 1935 |
| 2,273,398 | Couty | Feb. 17, 1942 |
| 2,399,790 | Conroy | May 7, 1946 |
| 2,427,685 | Midtlying et al. | Sept. 23, 1947 |
| 2,479,499 | LeClair | Aug. 16, 1949 |
| 2,550,583 | Millar | Apr. 24, 1951 |
| 2,622,652 | Conroy et al. | Dec. 23, 1952 |

FOREIGN PATENTS

| | | |
|---|---|---|
| 980,038 | France | Dec. 20, 1950 |